United States Patent [19]

Kovach et al.

[11] Patent Number: 4,619,008
[45] Date of Patent: Oct. 28, 1986

[54] DOCKBOARD CONSTRUCTION

[75] Inventors: Jonathan W. Kovach, Milwaukee; Martin P. Hageman, Mequon, both of Wis.

[73] Assignee: Kelley Company, Inc., Milwaukee, Wis.

[21] Appl. No.: 635,840

[22] Filed: Jul. 30, 1984

[51] Int. Cl.⁴ .............................................. E01D 1/00
[52] U.S. Cl. ..................... 14/71.7; 14/71.1; 298/17 B
[58] Field of Search ...................... 14/69.5, 71.1, 71.3, 14/71.7; 119/82; 105/436; 410/58, 63; 298/17 B; 254/88; 187/62

[56] References Cited

U.S. PATENT DOCUMENTS

| 3,117,332 | 1/1964 | Kelley | 14/71 |
|---|---|---|---|
| 3,137,017 | 6/1964 | Pfleger et al. | 14/71 |
| 3,173,644 | 3/1965 | Burfiend | 298/17 B X |
| 3,368,229 | 2/1968 | Pfleger | 14/71.3 |
| 3,606,627 | 9/1971 | Potter | 14/71 |
| 3,656,199 | 4/1972 | Bregantini | 14/71.7 |
| 3,728,753 | 4/1973 | Beckwith et al. | 14/71.3 |
| 3,858,264 | 1/1975 | Kuhns et al. | 14/71 |
| 3,902,213 | 9/1975 | Pfleger et al. | 14/71 |
| 3,967,337 | 7/1976 | Artzberger | 14/71.7 |
| 3,997,932 | 12/1976 | Artzberger | 14/71.3 |
| 4,014,059 | 3/1977 | Artzberger et al. | 14/71.3 |
| 4,091,488 | 5/1978 | Artzberger | 14/71.7 |
| 4,218,094 | 8/1980 | Leaver | 298/17 B |
| 4,376,319 | 3/1983 | Bedford | 14/71.3 |
| 4,402,100 | 9/1983 | Slusar | 14/71.3 |

FOREIGN PATENT DOCUMENTS 905613 7/1972 Canada .................... 14/71.3

Primary Examiner—Stephen J. Novosad
Assistant Examiner—John F. Letchford
Attorney, Agent, or Firm—Andrus, Sceales, Starke & Sawall

[57] ABSTRACT

A pit-mounted dockboard which eliminates the need for a conventional sub-frame and has an improved mechanism for retracting the cross traffic legs when the ramp is moved to a downwardly inclined below dock level position. The dockboard includes a ramp hinged to the supporting structure and movable from a horizontal cross traffic position to an upwardly inclined position and to a downwardly inclined below dock level position. A pair of cross traffic legs are pivoted to the forward portion of the ramp and are movable between an upright supporting position and a rearwardly pivoted retracted position. The cross traffic legs when in the supporting position engage the bottom of the pit in the loading dock to support the ramp in the cross traffic position. Locking means are engageable with the cross traffic legs to prevent the cross traffic legs from being pivoted to the retracted position when the ramp is in the cross traffic position. A gas spring assembly interconnects the cross traffic legs and an arm connected to the ramp to provide a toggle mechanism. The toggle mechanism can be manually moved to an overcenter position to load the gas spring, so that when the ramp is pivoted upwardly, the force of the gas spring assembly will move the cross traffic legs to the retracted position, so that the ramp can then be lowered to the downwardly inclined position. When the ramp reaches the downwardly inclined position, the toggle mechanism is automatically returned to the undercenter position so that the cross traffic legs can be returned to the upright supporting position on elevation of the ramp. An improved telescopic maintenance strut assembly is incorporated with the dockboard to hold the dockboard at an upwardly inclined position for maintenance.

16 Claims, 12 Drawing Figures

DOCKBOARD CONSTRUCTION

BACKGROUND OF THE INVENTION

The typical adjustable dockboard, which is adapted to span the gap between a loading dock and the bed of a carrier, includes a frame or supporting structure that is mounted in a pit in the dock. A ramp is hinged to the rear end of the frame and is movable from a horizontal cross traffic position to an upwardly inclined position, as well as to a downwardly inclined, below dock position.

The frame of the conventional dockboard is composed of a channel mounted along the front edge of the bottom of the pit, and a rear frame member is disposed along the rear edge of the pit bottom. In addition, a series of fore-to-aft structural members connect the front channel and the rear frame member.

In a hydraulically operated dockboard, a hydraulic cylinder unit is connected between the frame and the ramp, and the motor-pump unit, as well as the hydraulic reservoir, are located directly behind the front channel on the bottom of the pit. During use, dirt, debris, and other foreign material tends to collect on the bottom of the pit providing an unsightly appearance. It is difficult to clean the debris from the pit bottom, due to the front channel which extends across the front edge of the pit.

Some dockboard utilize a maintenance strut to hold the ramp in an upwardly inclined, elevated position while maintenance is being performed on the operating components of the dockboard which are located in the pit. It is desired to have a maintenance strut that is permanently attached to the dockboard so that it cannot be displaced, and the maintenance strut should be readily installed and removed from its operative position.

SUMMARY OF THE INVENTION

As one feature of the invention, the traditional subframe of the dockboard is eliminated, so that the pit is relatively free of obstructions and can be readily cleaned. In accordance with this feature, a housing is located at the rear of the pit and the ramp is hinged to a series of upstanding supports which are connected to the housing.

The ramp is pivoted to its upwardly inclined position by a hydraulic cylinder unit which is interconnected between the housing and the forward portion of the ramp. The motor and pump, as well as the reservoir for the hydraulic system, are located within the housing at the rear of the pit so that the forward area of the pit is relatively free of obstructions so it can be readily cleaned.

A lip is hinged to the forward edge of the ramp and can be pivoted from a downwardly extending pendant position to an extended position where it can be supported on the bed of a truck or carrier parked in front of the loading dock. The lip is pivoted between the pendant and extended positions in a conventional manner by use of a second hydraulic cylinder unit which connects the ramp and the lip.

To support the ramp in the horizontal cross traffic position, a pair of cross traffic legs are pivotally connected to the forward edge of the ramp and the lower ends of the legs are supported on the bottom of the pit when the ramp is in the horizontal position. When the cross traffic legs are supported on the floor of the pit, the legs are prevented from being pivoted inwardly by engagement of the lower ends of the legs with abutments projecting upward from the pit floor. This construction serves as a night lock, preventing the legs from being pivoted inwardly by an intruder and thus preventing the ramp from being lowered to a downwardly inclined below dock level position where the intruder could enter within the gap between the lowered ramp and the loading dock door.

In normal operation, when the ramp is elevated to an upwardly inclined position and the lip is moved to the extended position, a linkage, which interconnects the lip and the cross traffic legs will automatically move the cross traffic legs, to the rear inoperative position to thereby enable the ramp to move to a below dock level position, if necessary to accommodate a low truck bed.

In certain loading operations, such as when it is desired to remove end loads from a low truck bed, it is desirable to permit the ramp to move to a downwardly inclined below dock level position without the lip being pivoted to the extended position. A second feature of the invention accommodates this action. A gas spring interconnects the upper ends of the cross traffic legs with a rod that is pivotally connected to the underside of the ramp, and the gas spring and the rod act as a toggle mechanism. A chain is attached to the pivotal connection between the gas spring and the rod, and by manually pulling upward on the chain, the gas spring and rod are moved to an over-toggle position which serves to load the gas spring. However, with the ramp in the horizontal cross traffic position, the cross traffic legs rest on the floor of the pit and are restrained against rearward movement by engagement with the abutments. As such, the force of the loaded gas spring cannot act to pivot the legs to a retracted position.

By raising the ramp to disengage the cross traffic legs from the abutments, the force of the gas spring will then pivot the cross traffic legs to the retracted position, so that the ramp can subsequently be lowered to a downwardly inclined, below dock level position. As the ramp is lowered to the below dock level position, the rearwardly pivoted legs will engage the skid plate to return the gas spring and rod to the original under-toggle position, thereby releasing the force of the gas spring acting on the cross traffic legs, so that the legs will be returned to their normal upright operative position when the ramp is again raised to a horizontal position.

As a further feature of the invention, the dockboard also includes an improved maintenance strut. The maintenance strut comprises a pair of sliding telescopic members with the outer member being pivoted to the forward edge of the ramp by a pivoting pin. To utilize the strut, the ramp is elevated and the strut is pivoted from its horizontal storage position to a vertical position. The inner telescopic member is then engaged with a projection on the pit floor. As the ramp descends, the inner member will telescope relative to the outer member until the upper end of the inner member engages the pivot pin to hold the ramp in the desired inclined position.

The maintenance strut is permanently attached to the dockboard so it cannot be misplaced. In addition, the use of the telescopic members enables the maintenance strut to be readily engaged with the projection on the pit floor when the ramp is stationary and in the upwardly inclined position. This is a substantial improvement over maintenance struts in which the strut must be engaged as the ramp is moved downwardly.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
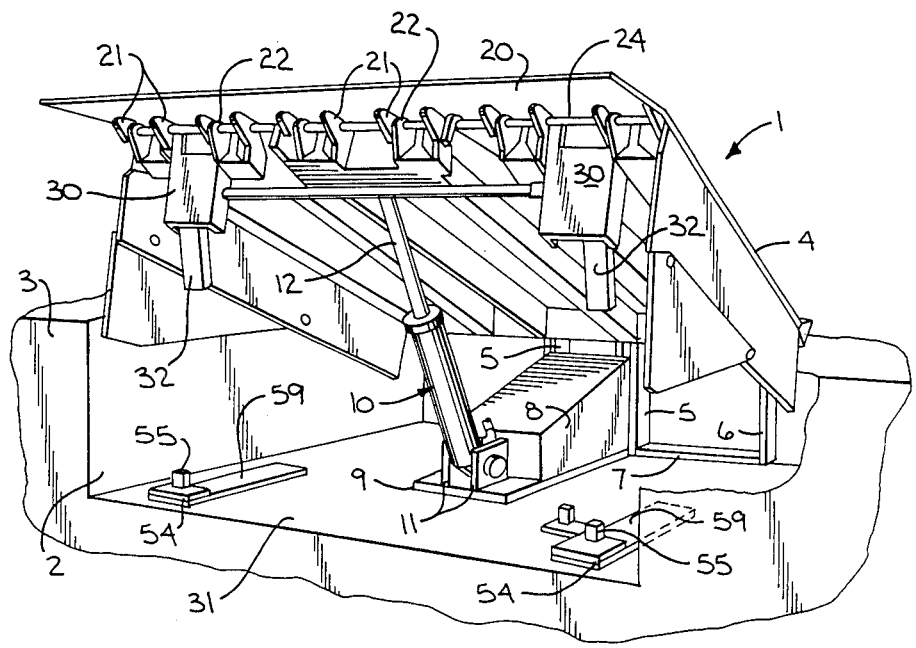
FIG. 1 is a perspective view of the dockboard of the invention.
Figure 2:
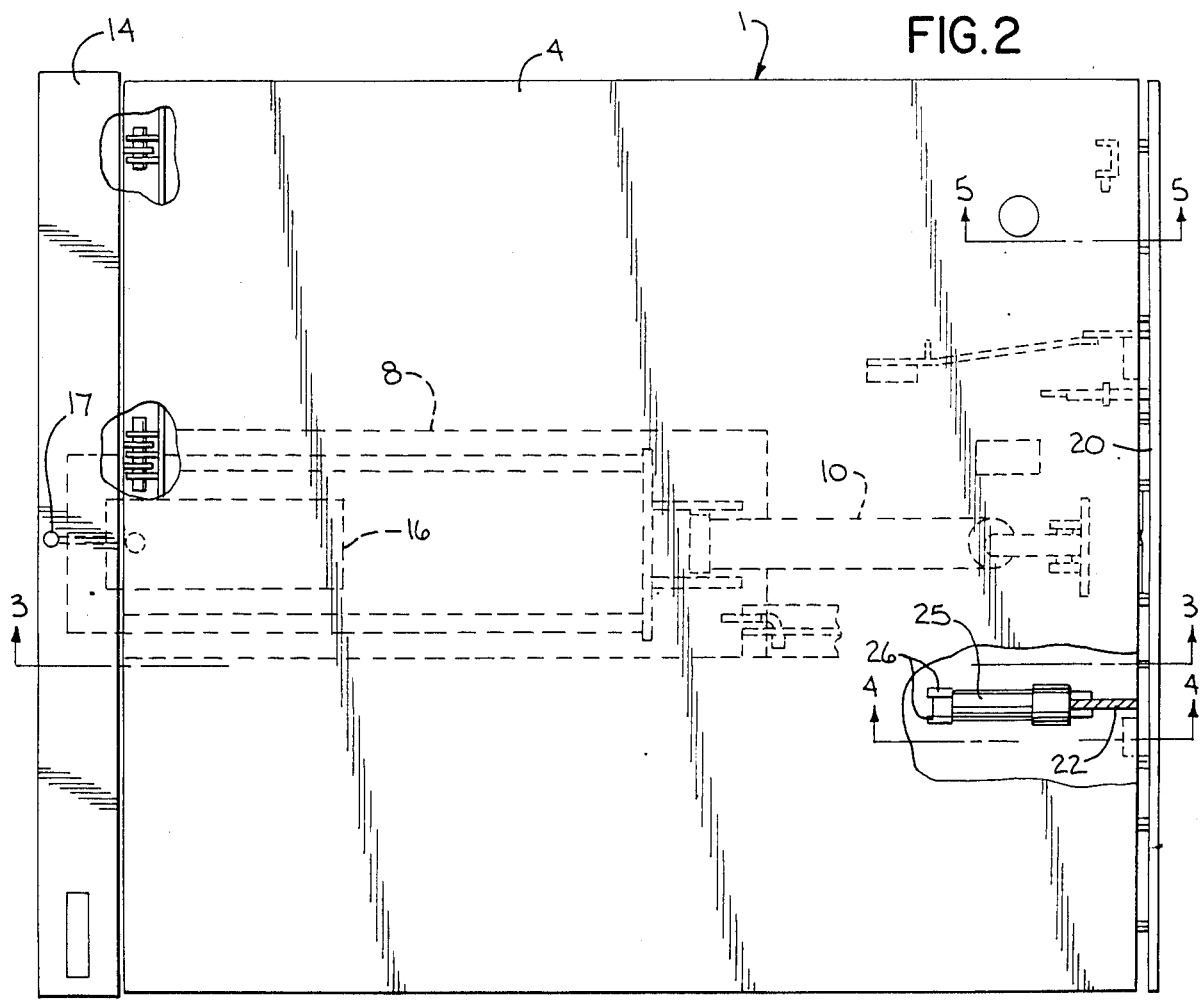
FIG. 2 is a top plan view of the dockboard shown in FIG. 1 with parts broken away in section.

FIG. 1 shows a hydraulic dockboard 1 which is mounted a pit 2 in a loading dock 3. The dockboard 1 includes a ramp 4 which is hinged to a pair of central uprights 5 and to a pair of end uprights 6 which are located at the rear of the pit. Base members 7 extend along the rear edge of the pit and connect the uprights 5 with the correspoding uprights 6.

Mounted centrally at the rear of pit 2 is a housing 8 which is supported on base plate 9. Uprights 5 are welded to the side surfaces of the housing 8.

Figure 3:
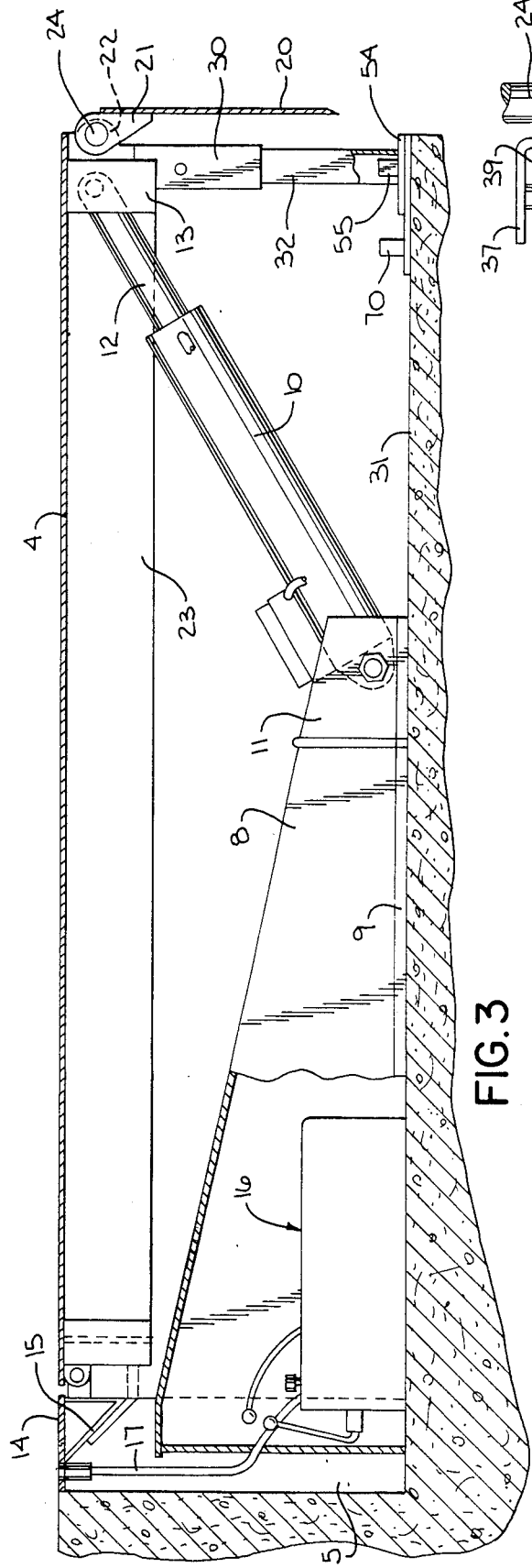
FIG. 3 is a side elevation of the dockboard.

The ramp 4 is moved from the horizontal cross traffic position shown in FIG. 3, to the upwardly inclined position by a hydraulic cylinder unit 10 which is pivotally connected to a pair of lugs 11 projecting upwardly from the forward end of housing 8. Piston rod 12, which is slidable in cylinder 10, is pivotally connected to lugs 13 which extend downwardly from the under surface of ramp 4. The introduction of hydraulic fluid into the lower end of cylinder 10 will operate in a conventional manner to extend piston rod 12 and raise the ramp from the horizontal cross traffic position to the upwardly inclined position.

The dockboard 1 also includes a rear deck plate 14 which extends transversely of pit 2 at the rear of the ramp and is connected by a triangular reinforcement 15 to the upper ends of uprights 5 and 6.

The motor, pump and hydraulic reservoir for the hydraulic system, indicated generally by 16, are housed within the housing 8 at the rear of the pit. A filler pipe 17 is connected to the hydraulic reservoir and extends upwardly to plate 14 and the upper end of filler pipe 17 is enclosed by a removable plug. A low level indicator light, not shown, is mounted on the control box and when lighted indicates a low level of hydraulic fluid. Additional hydraulic fluid can be introduced to the reservoir through the filler pipe 17.

With this construction, the normal sub-frame of the dockboard is eliminated and the housing 8 which houses the hydraulic components is located at the rear of the pit. As there are no cross frame members located at the front of the pit, debris and dirt can be readily cleaned from the pit.

Hinged to the forward edge of ramp 4 is a lip 20 that is movable between a downwardly hanging, pendant position and an outwardly extending position where it forms an extension to the ramp and bridges the gap between the ramp and a truck or carrier located in front of the loading dock. Lip 20 carries a series of lip lugs 21 which are hinged to the projecting lugs 22 welded to beams 23 of ramp 4 by a hinge shaft 24. Thus, the lip can swing upwardly about the axis of hinge shaft 24 between the pendant and extended positions.

Figure 4:
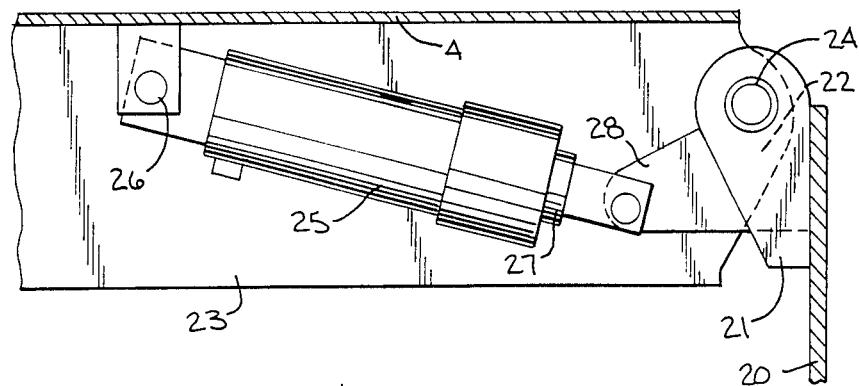
FIG. 4 is an enlarged side elevation showing the attachment of the lip cylinder to the lip.
Figure 10:
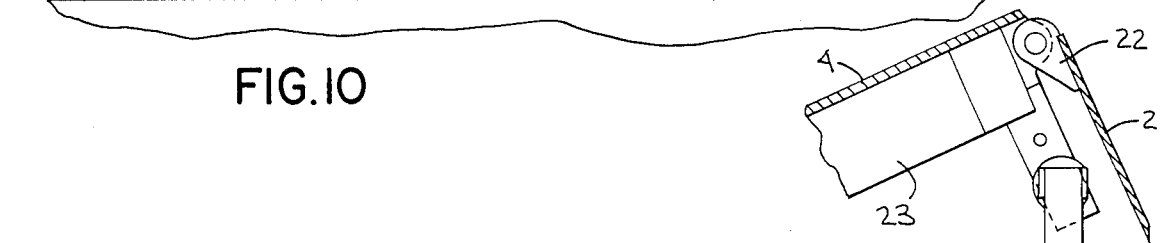
FIG. 10 is a front view of the dockboard with parts broken away and showing the maintenance strut in the stored position.

As best shown in FIG. 4, the lip is pivoted to the extended position in a conventional manner by a second hydraulic cylinder 25 which is pivoted to lugs 26 extending downwardly from the undersurface of ramp 4. Piston rod 27, which is slidable in cylinder 25, is pivotally connected to link 28 that engages the undersurface of lip 20. By introducing hydraulic fluid into the rear end of cylinder 25, the piston rod 27 will be extended to pivot the lip from the pendant to the extended position.

Ramp 4 can also move downwardly to a below dock level position to service lower truck beds, and in this regard, a pair of channel-shaped stops 30 are secured between adjacent beams 23. Stops 30 project downwardly from beams 23 and are adapted to engage the floor 31 of pit 2 to hold the ramp in the downwardly inclined, below dock level position.

Figure 6:
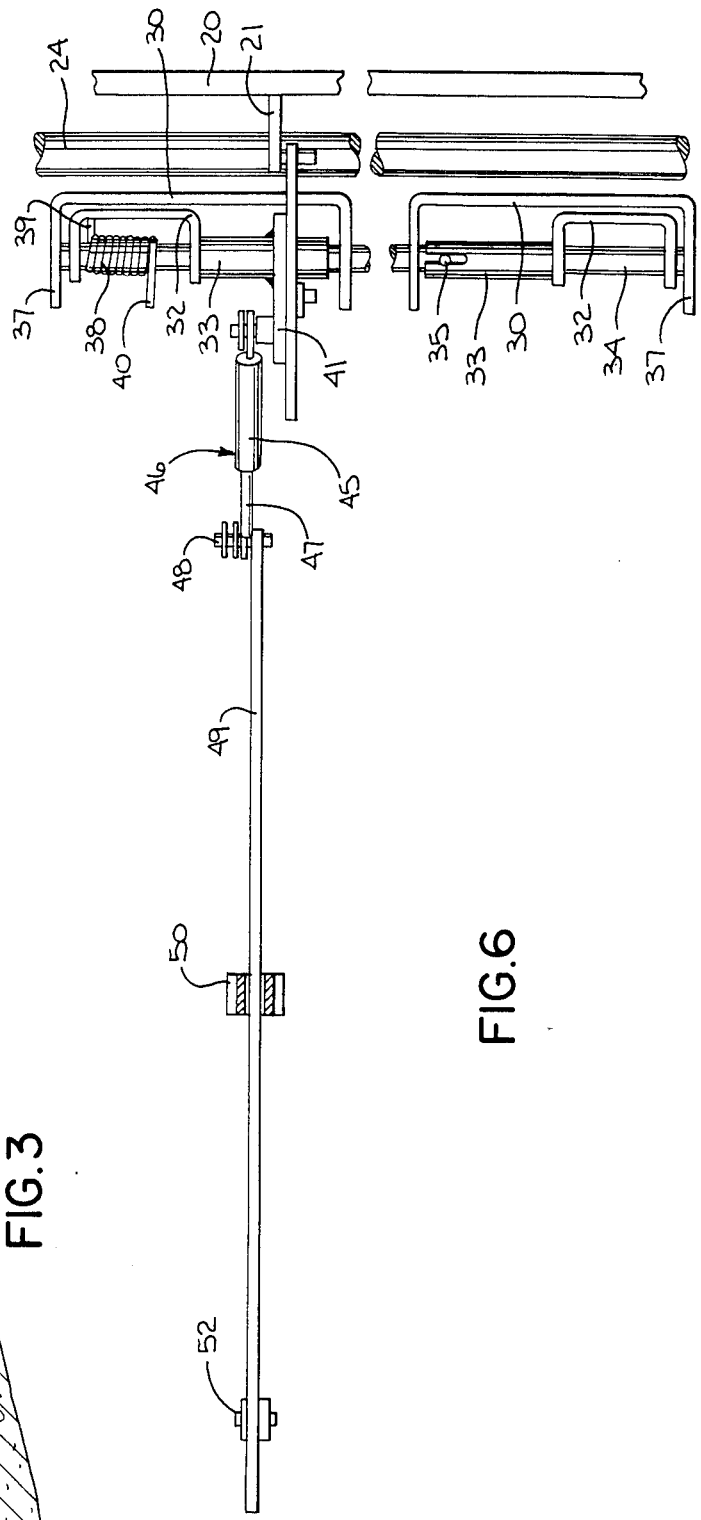
FIG. 6 is a horizontal section showing the mechanism for retracting the cross traffic legs.
Figure 5:
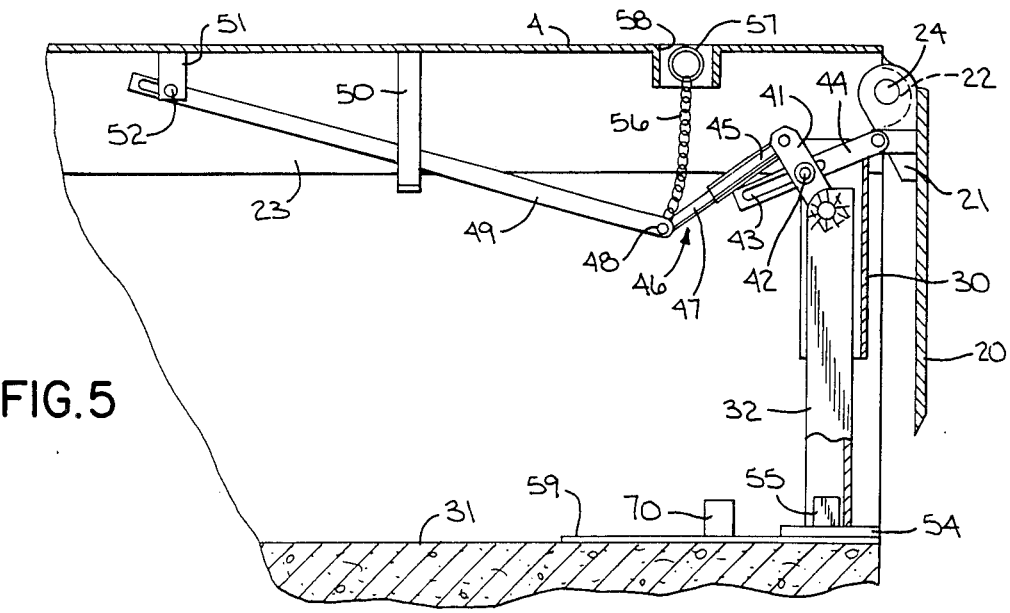
FIG. 5 is an enlarged side elevation showing the mechanism for retracting the cross traffic legs, with the cross traffic legs shown in the upright supporting position.

To support the ramp 4 in the horizontal cross traffic position, a cross traffic leg 32 is pivotally connected to each stop 30. As best shown in FIGS. 5 and 6, the cross traffic legs 32 are channel-shaped in cross section and are mounted on a horizontal tube 33. Tube 33 is connected to an inner shaft 34 by means of a pin 35 that projects outwardly from shaft 34 and is engaged within a slot 36 in tube 33. The ends of shaft 34 project outwardly of the respective cross traffic legs 32 and are journalled within openings 37 in the respective flanges of stops 30, as shown in FIG. 6. With this construction, shaft 34 and cross traffic legs 32 can pivot rearwardly with respect to the stops 30.

To urge the cross traffic legs 32 to the forward supporting position, a torsion spring 38 is disposed around shaft 34 and is located within in one of the legs 32, as illustrated in FIG. 6. One end 39 of spring 38 bears against the leg 32, while the opposite end 40 of the spring bears a lug attached to the undersurface of ramp 4. Thus, the force of torsion spring 38 will urge the cross traffic legs 32 forwardly to the upright supporting position, shown in FIG. 5.

In normal operation, the cross traffic legs 32 are pivoted to a retracted position as a consequence of the lip being swung from the pendant position to the extended position. As best shown in FIG. 5, the lower end of a link 41 is secured to tube 33, so that link 41 will pivot in accordance with pivotal movement of legs 32. A pivot 42 projects outwardly from link 41 and extends through an elongated slot 43 formed in arm 44. Arm 44 serves to interconnect lip 20 and cross traffic legs 32 in a manner to pivot the cross traffic legs to the retracted inoperative position as the lip is moved from the pendant position toward the extended position. The slot 43 serves as a lost motion connection and enables the lip to move through a predetermined angle of pivotal movement before movement of the lip is transmitted to pivot the cross traffic legs to the retracted position.

In certain loading or unloading operations it may be desirable to retract cross traffic legs 32, to enable the ramp to assume a downwardly inclined below dock level position, without extending lip 20. To provide this function, the upper or opposite end of link 41 is pivotally connected to lugs extending outwardly from the end of cylinder 45 of gas spring assembly 46. Gas spring assembly 46 also includes a piston rod or plunger 47 which is slidable in cylinder 45 and plunger 47 is pivotally connected at pivot 48 to the forward end of an elongated arm 49. Arm 49 is guided for fore and aft movement in a guide bracket 50 which extends downwardly from the undersurface of ramp 4, while the rear end of arm 49 is connected to lugs 51, that project downwardly from ramp 4, through a sliding pivot connection 52.

Gas spring assembly 46 in conjunction with arm 49 forms a toggle linkage, which as shown in FIG. 5, is in an under-center or under-toggle position. The toggle linkage acts, as hereinafter described, to pivot the cross traffic legs 32 to the retracted position when the ramp is raised and without the lip being moved to its extended position.

When the ramp 4 is in the horizontal cross traffic position, the lower ends of cross traffic legs 32 rest on plates 54 mounted on the bottom 31 of pit 2 and the legs are prevented from being pivoted to the retracted position by engagement of the web portion of the legs with upstanding projections 55 or abutments which project upwardly from the respective plates 54. The engagement of the legs 32 with the abutments 55 serves as a night lock, precluding the legs from being pivoted to the rear by an intruder and thereby preventing ramp 4 from being moved to its downwardly inclined, below dock level position. At the below dock level position, a gap exists between the ramp and the loading dock door and an intruder could gain access to the building through this gap.

In normal operation of the dockboard, when a truck pulls up to the dock, the operator will push the "raise" button or switch on the dock, actuating hydraulic cylinder 10 to move ramp 4 to the upwardly inclined position. Lip cylinder 25 is then actuated, moving lip 20 from the pendant to the extended position, and upward movement of the lip will be transmitted through arm 44 to pivot the cross traffic legs 32 from the supporting position to the retracted inoperative position. With the legs pivoted to the retracted position, the ramp, if necessary, can be lowered to a below dock level position to enable the lip to engage the bed of the carrier.

When the loading operation is completed and the truck pulls away from the dock, lip 20 will fall by gravity to its pendant position and the cross traffic legs, if the ramp is above dock level, will be returned to their upright supporting position by the torsion spring 38. On the other hand, if ramp 4 is at a below dock level position when the loading operation is completed, the operator will push the "raise" button, causing the ramp to elevate to an above dock level positon and the torsion spring 38 will then move cross traffic legs 32 to the supporting position. On lowering of the ramp, the legs 32 will then engage plate 54 on pit floor 31 to maintain the ramp in the cross traffic position.

Figure 7:
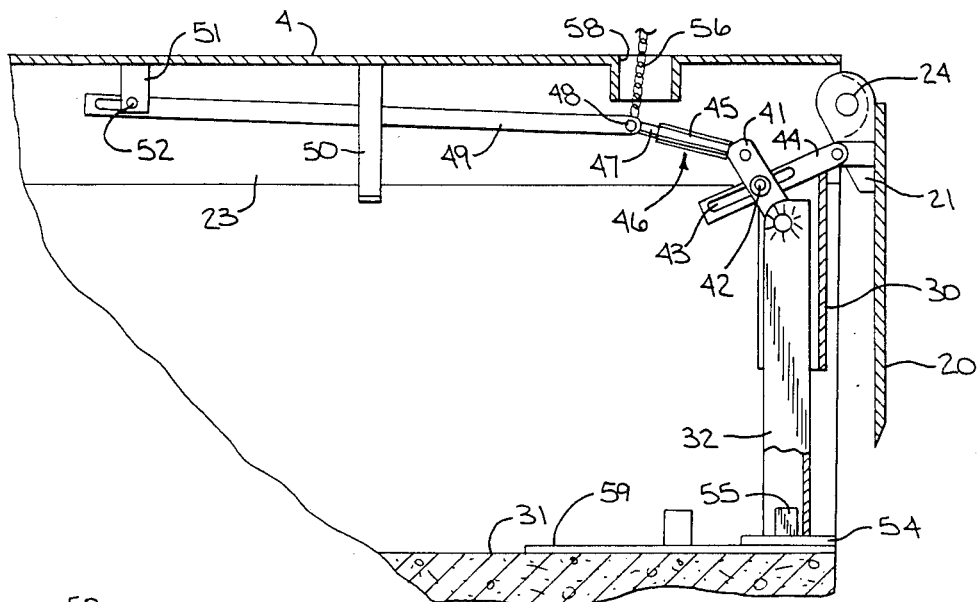
FIG. 7 is a view similar to FIG. 5 showing the gas spring in the over-toggle position.
Figure 8:
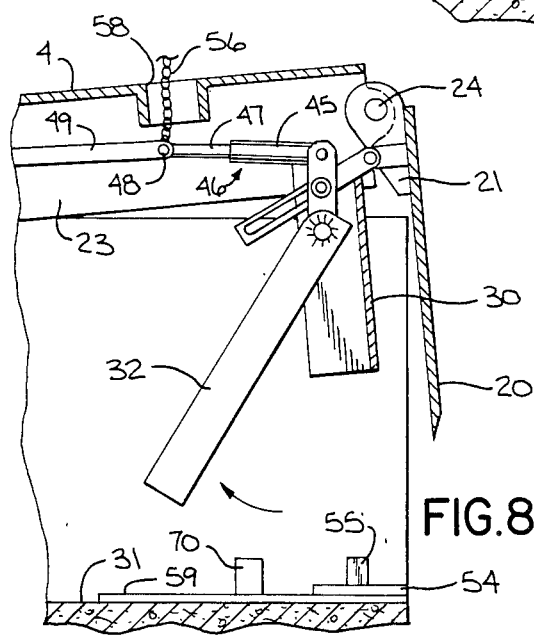
FIG. 8 is a view similar to FIG. 7 showing the ramp elevated and the legs retracted.

In certain situations, it is desirable to move cross traffic legs 32 to the retracted position without the necessity of pivoting the lip to its extended position and the toggle mechanism provided by gas spring assembly 46 and arm 49 provides this function. More particularly, a chain 56 is attached to the pivot 48 and the upper end of chain 56 terminates in a pull ring 57 (See FIG. 5) which is normally retained in a well 58 formed in the upper surface of ramp 4. By pulling upwardly on chain 56, pivot 48 will be moved upwardly to bring the toggle mechanism to an overcenter or over-toggle position, as shown in FIG. 7. Moving the toggle mechanism to the over-toggle position acts to retract plunger 47 with respect to cylinder 45 to load the gas spring. However, at this time, with ramp 4 in the horizontal position and cross traffic legs 32 supported on pit floor 31, the cross traffic legs cannot pivot to the rear because of the engagement with the abutments 55. The operator then actuates the "raise" button causing the ramp to be elevated through operation of cylinder 10. As cross traffic legs 32 move upwardly above the level of abutments 55, the force of the loaded gas spring assembly 46 will urge cross traffic legs rearwardly to the inoperative position, as shown in FIG. 8.

Figure 9:
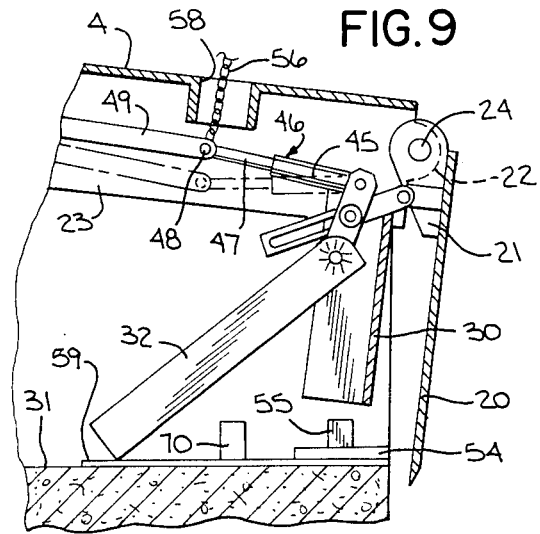
FIG. 9 is a view similar to FIG. 7 showing the ramp in a below dock level position.

As ramp 4 is subsequently lowered to a below dock level position, the retracted cross traffic legs engage the slider plate 59, as shown in FIG. 9, to break the toggle and return the gas spring assembly 46 and arm 49 to their original under-toggle position, as shown in FIG. 5. When the ramp 4 is subsequently raised above the cross traffic position, the torsion spring 38 will then return the cross traffic legs 32 to their upright supporting position.

With this construction, manual operation of the chain 56 serves to load the gas spring assembly 46, or biasing means, so that when the cross traffic legs are released from engagement with abutments 55, the legs will be pivoted to the rear. The loading of the biasing means is automatically released when the ramp moves downward to a predetermined position.

The invention also includes an improved maintenance strut construction for holding the ramp in an elevated position while maintenance is being performed on the hydraulic system or other components located beneath the ramp. The maintenance strut 60 includes a pair of telescopic members 61 and 62. The outer telescopic member 61 is pivotally connected by pin 63 to a swivel bracket 64 attached the flange 37 of one of the channel-shaped stops 30. Inner member 62 is slidable within outer member 61 and complete displacement of the inner member 62 from outer member 61 is prevented by chain 65. One end 66 of chain 65 is connected to the inner end of member 62, while the opposite end of the chain carries a ring 67 which is mounted on the pivot pin 63. The chain has a length such that the inner member can be extended with respect to the outer member, but the chain prevents the inner member from being completely displaced from the outer member.

Figure 11:
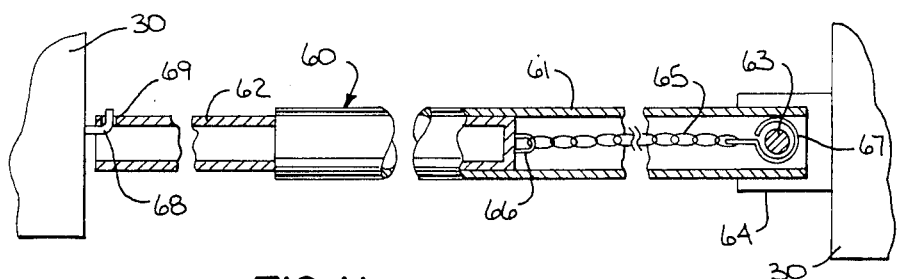
FIG. 11 is an enlarged plan view of the maintenance strut in the stored position with parts broken away.
Figure 12:
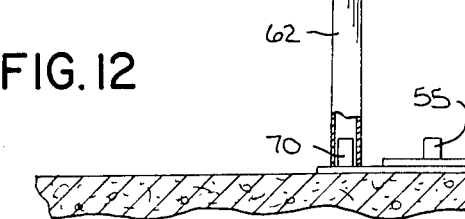
FIG. 12 is a side elevation with parts broken away showing the maintenance strut as it is being moved to the operative position.

FIG. 11 shows the storage position of the maintenance strut. In this condition, the outer end of member 62 is connected to stop 30 by means of a hook 68 attached to the stop which is engaged with a hole 69 in member 62.

When it is desired to use the maintenance strut to hold the ramp in an elevated position, the ramp is elevated and the member 62 is disengaged from the stop 30 by removing the hook 68 from hole 69. The maintenance strut is then pivoted to a generally vertical position and the inner member 62 is extended and engaged with a pin or abutment 70 mounted on floor 31 of the dock. The ramp is then lowered, causing the outer member 61 to move downwardly relative to the inner member 62 until the upper end of the inner member engages pivot pin 63 to thereby hold the ramp in the elevated position. Member 62 has a length greater than the distance between floor 31 and the pivotal connection between member 61 and ramp 4, when the ramp is in the horizontal position, so that the ramp will be held in an upwardly inclined position.

It is contemplated that the maintenance strut 60 can be constructed and arranged so that the lower end of outer member 61 engages the floor 31, instead of the upper end of inner member 62 engaging pin 63, to hold the ramp in an inclined position.

The maintenance strut has substantial advantages over conventional types. With the telescopic construction, the inner member 62 can be engaged with pin 70 when the inclined ramp is stationary, and when the ramp is subsequently lowered, the connection with pin 70 will be retained. Therefore, the invention eliminates the necessity of attempting to align the maintenance strut with an abutment on the pit floor during downward movement of the ramp.

Furthermore, as the maintenance strut is permanently attached to the dockboard it cannot be misplaced and thus will be available for use at all times.

Various modes of carrying out the invention are contemplated as being within the scope of the following claims particularly pointing out and distinctly claiming the subject matter which is regarded as the invention.

We claim:

1. In a dockboard to be mounted in a pit in a loading dock, a supporting structure, a ramp hinged to said supporting structure and movable from a horizontal cross traffic position to an upwardly inclined position and to a downwardly inclined below dock level position, means for pivoting the ramp between said positions, at least one cross traffic leg pivoted to the forward portion of the ramp and extending downwardly from the ramp and movable between an upright supporting position and a rearwardly pivoted retracted position, said cross traffic leg when in said supporting position disposed to engage the bottom of the pit to support the ramp in said horizontal cross traffic position, locking means engageable with the cross traffic leg to prevent the cross traffic leg from pivoting from the supporting position to the retracted position when the ramp is in the cross traffic position, first biasing means interconnecting said ramp and said leg, said first biasing means being movable between a loaded condition wherein said first biasing means exerts a force on said leg to urge said leg to said retracted position and a relaxed condition, manual means for moving said first biasing means from the relaxed condition to the loaded condition, means responsive to elevation of the ramp to a predetermined position above the cross traffic position for releasing said locking means to enable said first biasing means to pivot the cross traffic leg to the retracted position whereby the ramp can then be lowered to the downwardly inclined position, and means responsive to the ramp moving to a downwardly inclined position for moving said first biasing means from the loaded condition to the relaxed condition.

2. The dockboard of claim 1, and including stop means extending downwardly from the forward edge of the ramp and disposed to engage the bottom of the pit to support the ramp in the downwardly inclined position.

3. The dockboard of claim 1, and including a lip pivoted to the forward edge of the ramp and movable between a downwardly hanging pendant position and an outwardly extending position, means for pivoting the lip between the pendant and the extended positions when said ramp is in the upwardly inclined position, and means responsive to said lip moving from the pendant to the extended position for pivoting the cross traffic leg from the supporting position to the retracted position.

4. The dockboard of claim 3, wherein said means responsive to the lip moving from the pendant to the extended position includes a connecting member interconnecting the lip and said cross traffic leg, said connecting member including a lost motion connection arranged and constructed to permit said lip to move through a predetermined arc before pivotal movement of said lip will pivot the cross traffic leg to the retracted position.

5. The dockboard of claim 1, wherein said locking means comprises an upstanding member disposed on the bottom of the pit and engaged with a rear facing surface of said cross traffic leg.

6. The dockboard of claim 5, and including second biasing means for urging the cross traffic leg to the supporting position, the force of said first biasing means when in its loaded condition being greater than the force of said second biasing means.

7. The dockboard of claim 6, and including an arm having one end pivotally connected to said ramp, said first biasing means comprises a gas spring assembly having a first end connected to the upper end of said cross traffic leg and a second end operably connected to the opposite end of said arm, said gas spring assembly and said arm constituting a toggle mechanism with said toggle mechanism disposed in an undercenter condition when said cross traffic leg is supported on the bottom of the pit, said manual means including an actuating member connected to said toggle mechanism to move said toggle mechanism to an over-center position to thereby load said gas spring assembly.

8. The dockboard of claim 7, and including a link connected to the upper end of said cross traffic leg and extending upwardly and rearwardly from said leg, said first end of said gas spring assembly being pivotally connected to said link.

9. The combination of claim 7, wherein said actuating member is a cable connected to the pivotal connection between said gas spring assembly and said arm.

10. A dockboard to be mounted in the pit in a loading dock, comprising a supporting structure, a ramp hinged to said supporting structure and movable from a horizontal cross traffic position to an upwardly inclined position and to a downwardly inclined below dock level position, means for pivoting the ramp between said positions, at least one cross traffic leg pivoted to the forward portion of the ramp and extending downwardly from the ramp and movable between an upright supporting position and a rearwardly pivoted retracted position, said cross traffic leg when in said supporting position disposed to engage a surface to support the ramp in the horizontal cross traffic position, locking means engageable with the cross traffic leg when in said supporting position to prevent the cross traffic leg from pivoting from the supporting position to the retracted position when the ramp is in the cross traffic position, biasing means interconnecting said ramp and said leg, said biasing means being movable between a loaded condition wherein said biasing means exerts a force on said leg to urge said leg to the retracted position and a relaxed condition, an arm having one end pivotally connected to the undersurface of said ramp, said biasing means including a spring member having a first end connected to the upper end of said cross traffic leg and a second end operably connected to the opposite end of said arm, said spring member and said arm constituting a toggle mechanism with said toggle mechanism disposed in an undercenter condition when said cross traffic leg is supported on said surface, manual means including an actuating member connected to the toggle mechanism to move said toggle mechanism to the overcenter position to thereby load said spring member, and means responsive to elevation of the ramp to a predetermined position above the cross traffic position for releasing said locking means to enable said biasing means to pivot the cross traffic leg to the retracted position whereby the ramp can be lowered to the downwardly inclined position.

11. The dockboard of claim 10, and including means responsive to the ramp being moved to a downwardly inclined position for moving said biasing means from the loaded condition to the relaxed condition.

12. The dockboard of claim 10, wherein said spring member comprises a gas spring assembly including a cylinder and a piston slidable within said cylinder.

13. The dockboard of claim 10, wherein said locking means comprises an abutment extending upwardly from said surface and engaged with a rear facing surface of said cross traffic leg.

14. In combination with a dockboard having a supporting structure mounted in a pit formed in a loading dock, said dockboard having a ramp structure hinged to the supporting structure and movable from a generally horizontal cross traffic position to an upwardly inclined position, a maintenance strut assembly for said dockboard and comprising a pair of telescopic members, one end of a first of said members being pivotally connected to one of said structures by a pivot element and one end of a second of said members disposed to engage an abutment element on the other of said structures, said members having opposite free ends disposed in lapping telescopic relation, one of said members having a length equal to the distance between said abutment element and pivot element when said ramp structure is at a predetermined elevation short of its full inclined elevation, the free end of said one member disposed to engage the other element when said ramp is in said predetermined elevation to hold said ramp at said predetermined elevation.

15. The combination of claim 14, and including means interconnecting the first and second members to prevent complete displacement of said second member from said first member.

16. In combination, a loading dock having a pit formed in the upper and front surfaces thereof, said pit having a bottom, a dockboard having a frame mounted in said pit and including a ramp hinged to said frame and movable from a horizontal cross traffic position to an upwardly inclined position and to a downwardly inclined position below said horizontal position, said frame including a horizontal frame member disposed on the bottom of the pit adjacent the back surface of said pit, a plurality of uprights extending upwardly from said horizontal frame member, said ramp being hinged to the upper ends of said uprights, a base plate mounted on said bottom and having a rear end connected to said horizontal frame member and having a forward end spaced rearwardly of the front surface of said dock, a housing mounted on said plate at the rear of the pit and connected to said horizontal frame member and to said uprights, hydraulic cylinder means for moving said ramp between said positions, pivot means mounted on said plate forwardly of said housing for pivotally connecting one end of said hydraulic cylinder means to said plate, and hydraulic fluid supply means disposed within said housing for supplying fluid to said hydraulic cylinder means, said frame being free of side frame members that extend along the sides of said pit, the forward portion of the bottom of said pit being substantially free of structural components whereby debris can be readily cleaned from said bottom.

* * * * *